Patented Feb. 16, 1943

2,311,500

UNITED STATES PATENT OFFICE

2,311,500

EXTREME PRESSURE LUBRICANT

John C. Zimmer and George M. McNulty, Union, N. J., assignors to Standard Oil Development Company, a corporation of Delaware No Drawing. Application May 8, 1940, Serial No. 334,026

4 Claims. (Cl. 252—48)

The present invention deals with the production of lubricating compositions capable of withstanding high pressures under severe operating conditions. More specifically, it deals with lubricants containing small but effective amounts of condensation products of mercaptides with halogenated organic compounds, especially chlorinated hydrocarbons. Lubricating compositions of the extreme pressure type have been prepared in the past containing sulfur compounds in admixture with halogenated compounds and are still finding use in some lubricating fields. They are, however, limited by the fact that the sulfur compounds often separate out or have a deleterious effect on the accompanying halogen compounds while the latter may volatilize or decompose with liberation of corrosive acids. Some improvement has been effected by the use of condensation products of certain inorganic sulfides with chlorinated straight chain aliphatic hydrocarbons. However, it has been found that such compositions are limited as to the amount of combined sulfur which may be introduced therein. Furthermore, such compositions are quite viscous and often greatly increase the viscosity and pour point of the lubricating oil composition to be marketed.

An object of the present invention is to produce lubricating compositions which are especially heat resistant and stable even at elevated temperatures and which are so fluid as to have no appreciable effect upon the channeling tendencies or pour point of the resulting blend. It is also a purpose to produce extreme pressure agents which are much more effective than other sulfur compounds hitherto produced.

The base for the lubricating compositions involved in the present invention is produced by condensing mercaptides with halogenated organic compounds, e. g. chlorinated esters, fatty acids, ketones, furfuryl compounds, etc. but especially with chlorinated hydrocarbons. Although straight chain halogenated hydrocarbons, such as chlorinated wax, are satisfactory for the reaction, it is desired to employ halogenated and preferably chlorinated aromatic hydrocarbons. The mercaptides employed for the condensation reaction are generally alkali or alkaline earth metal mercaptides such as sodium amyl mercaptide, sodium butyl mercaptide, potassium, ammonium, barium, strontium, or calcium mercaptides, and the like, with or without the simultaneous addition of elementary sulfur. Phosphorous sulfides such as the sesquisulfide ($P_4S_3$), and other sulfides such as $P_2S_5$, $PSCl_3$, etc. may be added to the reaction mixture. These reagents or reactants may also be employed for this reaction in conjunction with sulfur halides, sulfuryl halides, and the like. However, the alkali metal alkyl mercaptides are the preferred reagents and they may be used as such or prepared in situ by the addition of the alkali hydroxide to the mercaptans either in the presence or absence of sulfur or hydrogen sulfide. When the mercaptides are employed, the condensation products obtained contain much more active sulfur than products obtained by the condensation of chlorinated hydrocarbons with inorganic sulfides or polysulfides, thereby producing a much more potent base.

The mercaptides heretofore described are condensed with halogenated organic compounds, and especially with halogenated hydrocarbons such as chlorinated wax, chlorinated petroleum distillates, and especially chlorinated cyclic hydrocarbons such as chlorinated solvent extracts, e. g. Edeleanu extract, phenol extract, extracts of nitrobenzene, furfural, cresols and similar solvents which have a preferential selectivity for aromatic hydrocarbons. Pure or relatively pure compounds such as alkyl benzenes, alkyl naphthalenes, coal tar distillates, and the like; terpene hydrocarbons such as turpentine, pine oil, pine stump extract, etc. may be employed, although the products obtained are not as satisfactory as those obtained with aromatic hydrocarbons of the class disclosed. It is preferred to employ solvent extracts of naphthas, kerosenes or gas oils and especially sulfur dioxide extracts of kerosene. In many cases, cycle oil of a refractory nature and high in aromatic content obtained as recycle stock from thermal or catalytic cracking of gas and other petroleum oils in the manufacture of gasoline or distillates from cracking oil residua, or natural occurring aromatic hydrocarbons such as Conroe naphtha may be employed, although it is desirable to use a raw material which is substantially free from aliphatic hydrocarbons, i. e. they should contain less than about 30% and preferably not over 20 or even 10% of such hydrocarbons. These hydrocarbons are halogenated by treatment with chlorine, bromine, fluorine, or iodine or mixtures thereof or sulfuryl halides at from room temperature to about 300° F. Catalysts such as benzoyl peroxide, metal halides, actinic radiation, etc. may be employed to hasten the halogenation.

The condensation is carried out by dissolving one of the ingredients in an inert solvent such as water, an alcohol (ethyl alcohol, isopropyl alcohol, etc. or a ketone, e. g. acetone methylisobutyl ketone, etc.) and gradually adding the other reactant at a refluxing temperature (about 150–300° F. or higher) until reaction has substantially completed (one-half to 12 hrs.) whereupon the mixture is allowed to cool, the salt separated off by decantation or in any other suitable manner, and the resulting mixture distilled to remove solvent and washed with alkali to remove any excess sulfur or acidic constituents. If desired, additional reactants may be added to the reaction mixture and the reaction continued until the solvent is supersaturated with the desired sulfur-chlorine compound. The mixture may then be allowed to stand and the separated reaction product drawn off from the solution which is again reused for the preparation of additional products. This procedure avoids the distillation step to recover the desired sulfur and chlorine containing product. The invention will be understood more clearly from the following examples which, however, are not employed to limit the invention with respect to conditions or otherwise:

Example I

Roughly, 2 liters of isopropyl alcohol and 10 grams of sodium hydroxide are heated until complete solution is effected, and then 26 grams of amyl mercaptan are gradually added to the mixture which is stirred for 10–15 minutes. After this, 50 grams of flowers of sulfur are added and the whole mixture is refluxed for 1–2 hours.

About 300 grams of chlorinated aromatic petroleum hydrocarbons boiling in the $C_9$ range are gradually added to the above while refluxing and the refluxing is continued for about 4 hours. The resulting product is then allowed to cool and the separated solids are removed by decantation or otherwise. The alcohol is distilled off and recovered.

The extreme pressure lubricating base thus obtained is a fluid, high boiling, reddish liquid having a mild odor characteristic of sulfur compounds and contains 7.4% combined sulfur and about 35% combined chlorine.

When added to a low viscosity neutral petroleum cutting oil base stock in about 5–20% concentration, highly effective cutting oils are produced.

Example II

A product prepared by condensing chlorinated aromatic kerosene hydrocarbons with mercaptides (obtained from mixed mercaptans from the caustic sweetening of sour distillates and containing a little $C_1$ and larger amounts of $C_2$, $C_3$, $C_4$, $C_5$ and some higher mercaptans, but composed mainly of $C_2$–$C_5$ mercaptans) showed a sulfur content of 11% S and yielded an excellent concentrated E. P. base.

Example III

An excellent E. P. base is obtained by reacting 20 grams of sodium hydroxide, 50 grams sulfur, 19 to 38 grams of mixed refinery mercaptans, and 350 grams of chlorinated Edeleanu extract of kerosene, the procedure being as outlined in Example I.

Under these conditions, the yield of E. P. base is 325 grams, containing up to 11% sulfur.

Example IV

Thirty-eight grams of mixed refinery mercaptans were dissolved in 800 grams of water containing 20 grams of sodium hydroxide. One molecular equivalent of sulfur was added (32 grams) and the mixture brought up to the boiling point and held there for 15 minutes. Then, one hundred and fifty grams of a chlorinated aromatic hydrocarbon were slowly added to the boiling solution. Mechanical agitation was used to ensure intimate contact of the reacting materials. Boiling and stirring were continued for ten minutes after all of the chlorinated hydrocarbon had been added to complete the reaction. The desired product was separated out, washed with water and dried. The sulfur content of the extreme pressure lubricant base was 15.1%.

When blended in 10% concentration in mineral gear oil, this material yields an extreme pressure lubricant capable of carrying 325 to 500 lbs. on the S. A. E. Extreme Pressure Lubricants Testing machine at 1000 R. P. M. and 14.6:1 rubbing ratio. Also, this blending satisfactorily lubricates the current model Chevrolet rear axle under extremely severe road test conditions as required by the General Motors Standards, vol. II, July 1939, p. D–5 to D–6.

The production of this material can be carried out in a continuous or semi-continuous operation by cooling the reaction mixture, allowing the excess product over that necessary to saturate the alcohol to separate out by gravity, removing the alcohol solution by decantation, and charging it to the reaction vessel together with additional quantity of reactants and refluxing for the required time.

The resulting condensation product generally contains about 2 to 10% sulfur and about 20 to 45% chlorine, although it may contain as little as 5–10% chlorine in cases where special lubrication conditions so require it. Such a product when blended in 10% concentration in mineral oil shows no evidence of gear scoring or scratching under the Chevrolet car test conditions mentioned above.

The extreme pressure lubricating bases prepared according to this invention are compounded with lubricating oils of practically any required viscosity. They are especially compatible with high viscosity index stocks such as those having viscosity indices of over 80 or even 100, although suitable compositions may be prepared from Coastal, Mid-Continent or other lubricating oils containing distillate or residual ingredients. Synthetic, natural, fatty and other lubricating oils may also be employed alone or in conjunction with mineral lubricating oils for such compositions. These extreme pressure bases may likewise be compounded with amines, organic bases, sulfurized mineral or fatty oils, phosphorous compounds such as tricresyl phosphate, pour inhibitors, antioxidants, dyes, metal or amine soaps, metal phenolates, organic sulfides or polysulfides, halogenated organic compounds, polymer V. I. improvers, and the like. They are especially adapted for the production of cutting oils, metal fabricating compounds, greases and similar compositions employed under conditions where heavy loads, shock loads or extreme pressures are encountered.

Since homogeneous lubricating compositions are contemplated, the ingredients must be selected to give oil soluble condensation products. In order to prepare the blends suitable for lubricating work, about 0.1 to 5 or 10% and sometimes up to 25% of the condensation products containing the inorganic elements may be employed.

We claim:

1. A lubricating composition adapted for high pressure service conditions comprising a lubricating oil containing a small but effective amount of an oil-soluble condensation product of sodium mercaptide and a chlorinated solvent extract of petroleum hydrocarbons containing about 10 to 50% chlorine.

2. A lubricating composition according to claim 1 in which the condensation product is a reaction product of sodium mercaptide and a chlorinated sulfur dioxide kerosene extract containing about 20 to 50% chlorine.

3. A lubricating composition adapted for high pressure service conditions comprising a lubricating oil containing a small but effective amount of an oil soluble condensation product of a metal mercaptide and chlorinated aromatic kerosene hydrocarbons containing about 10-50% chlorine.

4. A lubricating composition adapted for high pressure service conditions comprising a lubricating oil containing a small but effective amount of an oil soluble condensation product of a metal mercaptide, free sulfur, and chlorinated aromatic kerosene hydrocarbons containing about 10-50% chlorine.

JOHN C. ZIMMER.
GEORGE M. McNULTY.